(12) United States Patent
Reyes et al.

(10) Patent No.: US 8,930,806 B2
(45) Date of Patent: Jan. 6, 2015

(54) PROVIDING TOOLBARS

(75) Inventors: Emerando Delos Reyes, Pleasant Hill, CA (US); Benjamin J. Parker, Vacaville, CA (US); Samir Ait-Ameur, Fremont, CA (US); Lin Sun, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 245 days.

(21) Appl. No.: 13/224,934

(22) Filed: Sep. 2, 2011

(65) Prior Publication Data

US 2013/0061127 A1 Mar. 7, 2013

(51) Int. Cl.
*G06F 17/21* (2006.01)
*G06F 17/30* (2006.01)
*G06Q 30/02* (2012.01)

(52) U.S. Cl.
CPC ............ *G06F 17/3089* (2013.01); *G06Q 30/02* (2013.01)
USPC ........................................................ 715/234

(58) Field of Classification Search
CPC .................................................. G06F 17/2247
USPC ........................................................ 715/234
See application file for complete search history.

(56) References Cited

U.S. PATENT DOCUMENTS

| | | | |
|---|---|---|---|
| 6,266,681 B1 * | 7/2001 | Guthrie .......................... | 715/234 |
| 7,136,896 B1 * | 11/2006 | Srinivas et al. ................ | 709/203 |
| 2002/0019774 A1 * | 2/2002 | Kanter ............................ | 705/14 |
| 2002/0032608 A1 * | 3/2002 | Kanter ............................ | 705/14 |
| 2004/0125130 A1 * | 7/2004 | Flamini et al. ................ | 345/738 |
| 2006/0031404 A1 * | 2/2006 | Kassab .......................... | 709/218 |
| 2006/0058019 A1 * | 3/2006 | Chan et al. ................ | 455/422.1 |
| 2006/0059043 A1 * | 3/2006 | Chan et al. ..................... | 705/14 |
| 2006/0259359 A1 * | 11/2006 | Gogel ............................. | 705/14 |
| 2008/0016113 A1 * | 1/2008 | Theobald et al. .......... | 707/104.1 |
| 2008/0140728 A1 * | 6/2008 | Fraser et al. .................. | 707/200 |
| 2008/0168099 A1 * | 7/2008 | Skaf ........................... | 707/104.1 |
| 2008/0288342 A1 * | 11/2008 | Ingleshwar ..................... | 705/14 |
| 2009/0006974 A1 * | 1/2009 | Harinarayan et al. ........ | 715/738 |
| 2009/0106237 A1 * | 4/2009 | Holstein et al. .................... | 707/5 |
| 2009/0164920 A1 * | 6/2009 | Stelle ............................ | 715/760 |
| 2009/0228814 A1 * | 9/2009 | Kobayashi .................... | 715/764 |
| 2009/0240582 A1 * | 9/2009 | Sheldon-Neal et al. ........ | 705/14 |
| 2010/0228963 A1 * | 9/2010 | Kassab et al. ................. | 713/150 |
| 2010/0318426 A1 * | 12/2010 | Grant et al. ................ | 705/14.66 |
| 2011/0161799 A1 * | 6/2011 | Srinivas et al. ............... | 715/234 |
| 2011/0202654 A1 * | 8/2011 | Marquess et al. ............. | 709/224 |
| 2012/0151375 A1 * | 6/2012 | Lin et al. ....................... | 715/741 |
| 2012/0209872 A1 * | 8/2012 | Woods et al. ................. | 707/769 |
| 2012/0331376 A1 * | 12/2012 | Gorokhovsky et al. ....... | 715/234 |
| 2013/0191450 A1 * | 7/2013 | Bodenhamer et al. ........ | 709/203 |

OTHER PUBLICATIONS

Hsieh, Ming-Chih, Yung-Wei Kao, and Shyan-Ming Yuan. "Web 2.0 toolbar: Providing web 2.0 services for existence web pages." In Asia-Pacific Services Computing Conference, 2008. APSCC'08. IEEE, pp. 507-512. IEEE, 2008.*

* cited by examiner

*Primary Examiner* — Frank D Mills (57) ABSTRACT

A server device receives a request for a document of a website from a user device; retrieves the document from a server that hosts that website; retrieves information associated with the user device; determines a toolbar for the document based on the information associated with the user device and information associated with the document; inserts the toolbar into the document; and transmits the document, with the toolbar, to the user device.

21 Claims, 7 Drawing Sheets

| USER DEVICE ID 705 | MSC CDR 710 | SMS CDR 715 | MMS CDR 720 | TOOLBAR PREFERENCES 760 | | DEMOGRAPHICS INFORMATION 770 | TARGETED ADVERTISING STATUS 780 | |
|---|---|---|---|---|---|---|---|---|
| | | | | USAGE CATEGORY 725-1 | USAGE CATEGORY 725-M | CONTENT CATEGORY 730-1 | CONTENT CATEGORY 730-N | PERFORMANCE ANALYTICS 735 |
| | MDN-A | MDN-020 | MDN-D | CONTENT PROVIDER 1 | cost1, time1, bytes1, BW1 | VIDEO1 | GENRE1 | FLOW QTY |
| | LDN-B | MDN-021 | email2 | CONTENT PROVIDER 2 | cost2, time2, bytes2, BW2 | AUDIO2 | GENRE2 | SESSION TIME |
| | MDN-C | MDN-022 | ADDRESS3 | CONTENT PROVIDER 3 | Cost3, time3, bytes3, BW3 | TEXT3 / GAMES3 | GENRE3 | PEAK LOAD |
| | 742 | 744 | 746 | | 748 | 750 | | 752 |

PROVIDING TOOLBARS

BACKGROUND

Websites incorporate active toolbars into their web pages. An active toolbar includes buttons that run scripts, which pass information to other websites. Providers of different websites use different architectures and/or implementations for different toolbars. A service provider (e.g., an Internet service provider (ISP)) can add active toolbars to web pages. The service provider has to support different architectures of the different toolbars. However, the different architectures are difficult to manage and exhaust considerable resources of the service provider. Furthermore, the service provider is unable to use a single, uniform architecture to provide different toolbars, for different websites, to different types of computing devices.

DETAILED DESCRIPTION OF PREFERRED EMBODIMENTS

The following detailed description refers to the accompanying drawings. The same reference numbers in different drawings may identify the same or similar elements.

An implementation, described herein, may provide a uniform architecture for including toolbars in different web pages that are provided to user devices, such as mobile devices. For example, a management system, of an ISP, may receive, from a user device, a request for a web page of a website. The management system may retrieve the web page and subscriber data associated with a user of the user device. The management system may include a toolbar in the web page based on the subscriber data and information associated with the web page. The management system may transmit the web page with the toolbar to the user device. The toolbar may allow the user to keep the toolbar for other web pages in exchange for opting-in for targeted advertising.

In the description to follow, reference will be made to web pages and websites. A web page, as used herein, is to be broadly interpreted to include any machine-readable and machine-storable work product, including a document. A document may include, for example, an e-mail, a file, a combination of files, one or more files with embedded links to other files, a news group posting, a blog, a web advertisement, a Uniform Resource Locator (URL), etc. In the context of the Internet, a common document is a web page. Web pages often include textual information and may include embedded information (such as meta information, images, hyperlinks, etc.) and/or embedded instructions (such as Javascript, etc.). A website, as used herein, is to be broadly interpreted to include a collection of related documents, such as documents associated with a same host or organization. For example, the collection of related documents might include all or a subset of the documents associated with a traditional website, directory, or sub-directory, or some other set of documents that are related to each other (e.g., on the same host or associated with the same organization).

Figure 1:
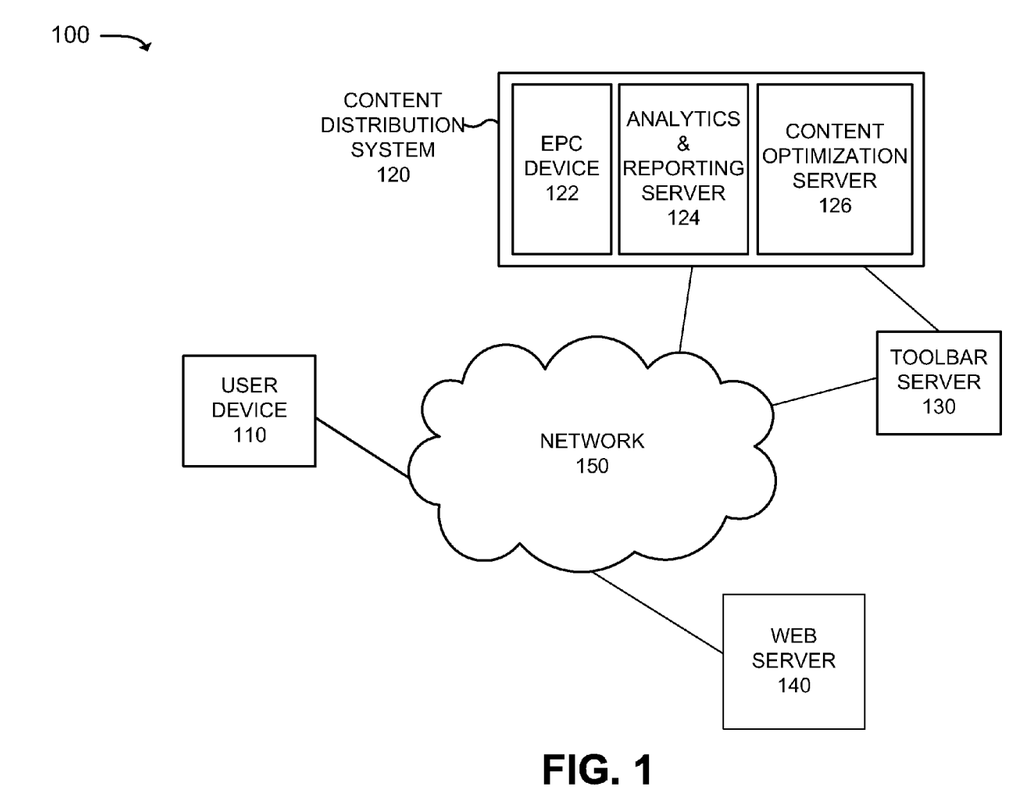
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include one or more of the following components: a user device 110, a content distribution system (CDS) 120, a toolbar server 130, a web server 140, and a network 150. As further shown in FIG. 1, CDS 120 one or more of the following components: an embedded packet capture (EPC) device 122, an analytics and reporting (AR) server 124, and a content optimization (CO) server 126. A single user device 110, EPC device 122, AR server 124, CO server 126, toolbar server 130, web server 140, and network 150 have been illustrated in FIG. 1 for simplicity. In practice, there may be more user devices 110, EPC devices 122, AR servers 124, CO servers 126, management servers 120, toolbar servers 130, web servers 140, and/or networks 150. Also, in some implementations, one or more of the components of environment 100 may perform one or more functions described as being performed by another one or more of the components of environment 100.

Furthermore, two or more of the components, of FIG. 1, may be implemented within a single device, or a single component may be implemented as multiple, distributed devices. Also, components of environment 100 may interconnect via wired and/or wireless connections. In other words, any two components, of environment 100, may communicate via a wired connection, a wireless connection, or a combination of a wired connection and a wireless connection.

User device 110 may include any computation or communication device, such as a communication device that is capable of communicating with web server 140 via CDS 120 and network 150. In one implementation, user device 110 may take the form of any mobile device, including a smart phone, a personal digital assistant (PDA), a handheld computer, a personal media player, etc. Alternatively, or additionally, user device 110 may take the form of any computer, including a web service terminal, a personal computer, a laptop computer, or any other device capable of transmitting and/or receiving data.

In one example, user device 110 may enable a user to utilize an Internet browser to request a web page of a website provided/hosted by web server 140. User device 110 may receive the web page with a toolbar from CDS 120. User device 110 may display the web page with the toolbar. The user may use user device 110 to interact with the web page and/or the toolbar.

CDS 120 may include one or more devices that gather, process, search, store, and/or provide information in a manner similar to that described herein. CDS 120 may represent an in-line network element of network 150, and may, for example, intercept any requests transmitted from user device 110 to web server 140. In another implementation, CDS 120 may include additional components, fewer components, different components, and/or differently arranged components than are shown in FIG. 1. For example, CDS 120 may include toolbar server 130.

CDS 120 may receive a request for a web page (e.g., a Hypertext Transfer Protocol (HTTP) GET request) from user device 110. CDS 120 may retrieve the web page from web server 140 based on the request. In one implementation, CDS 120 may identify a location of the web page (e.g., stored at web server 140) by using a reverse IP look-up. Alternatively, or additionally, CDS 120 may identify the location of the web page (e.g., stored at web server 140) by using a domain naming system (DNS) query evaluation.

CDS 120 may identify a subscriber (e.g., determine an identifier of the subscriber) associated with user device 110 based on the request for the web page. CDS 120 retrieve subscriber data (e.g., based on the identifier) associated with the subscriber and/or user device 110.

CDS 120 may transmit a request for a toolbar, including the subscriber data and/or information associated with the web page, to toolbar server 130. CDS 120 may receive code (e.g., HMTL code) for the toolbar and an insertion point that specifies where to insert the code for the toolbar in code of the web page (e.g., at a specific line). CDS 120 may insert the toolbar into the web page, and transmit the web page with the toolbar to user device 110.

Alternatively, or additionally, CDS 120 may receive a request from user device 110 to keep the toolbar, as a browser toolbar, for other web pages. In response, CDS 120 may provide options to user device 110 for keeping the toolbar as the browser toolbar. In one example, the options may require the subscriber to opt-in for targeted advertising in exchange for keeping the toolbar as the browser toolbar. CDS 120 may receive a selection of one of the options and an acceptance by the user to opt-in for the targeted advertising. Thereafter, CDS 120 may provide the browser toolbar, based on the selected option, to user device 110.

CDS 120 may collect analytical and reporting (AR) information associated with traffic being sent to and/or received from user device 110. CDS 120 may, for example, obtain AR information associated with traffic flows between user device 110 and web server 140 and/or one or more other web servers, which may include a quantity of communications with each of the web servers, a type of content associated with the communications, a type of content genre, etc. CDS 120 may obtain AR information associated with communications (e.g., instant message, email, calls, social networking, etc.) between user device 110 and other user devices (not shown in FIG. 1) (e.g., quantity, duration, bandwidth, etc.). CDS 120 may collect AR information associated with network performance when user device 110 communicates with the web servers and/or the other user devices. CDS 120 may use the collected AR information to ascertain usage behaviors associated with user device 110 and/or to identify preferences associated with user device 110 (e.g., preferred content genres, purchase habits, calling habits, browsing patterns, etc.). CDS 120 may provide information associated with the usage behaviors and/or the preferences to toolbar server 130 in toolbar requests.

EPC device 122 may include a network device that, receives, processes, switches, routes, and/or transmits packets associated with traffic being transported to and/or from network 150. For example, EPC device 122 may take the form of a routing device, a switching device (e.g., an Ethernet switch, etc.), a multiplexing device, or a device that performs a combination of routing, switching, and/or multiplexing functions. In one example implementation, EPC device 122 may be a digital device. In another example implementation, EPC device 122 may be an optical device. In yet another example implementation, EPC device 122 may be a combination of a digital device and an optical device.

EPC device 122 may generally function to connect user device 110 to CO server 126 and/or web server 140. For example, EPC device 122 may transfer traffic, received from user device 110 (e.g., via network 150) to CO server 126. In another example, EPC device 122 may receive, from network 150 and via CO server 126, traffic that is destined for user device 110 and EPC device 122 may send the traffic to user device 110 via network 150. EPC device 122 may transfer DNS queries, received from user device 110 via network 150, to a domain name system (DNS) cache to obtain an IP address associated with web server 140 and/or a particular a content distribution network (CDN) caching server from which content is to be retrieved. EPC device 122 may forward, to CO server 126, the obtained IP address that enables the content to be retrieved from web server 140 and/or the CDN caching server.

The DNS cache may be a memory device, in DCS 120, that stores one or more IP addresses for one or more web servers, including web server 140, and/or one or more CDN caching servers from which content can be obtained. The CDN caching server, in DCS 120, may process a variety of types of content that is downloaded from the one or more web servers (e.g., as streaming media, progressive streaming, progressive download, etc.) for storage by CDN caching server. CDS 120 may retrieve content from the CDN caching server instead of retrieving the content from one of the one or more web servers.

AR server 124 may include one or more server devices, or other types of computation or communication devices, that gather, process, search, store, and/or provide information in a manner similar to that described herein. In one example implementation, AR server 124 may monitor and/or collect AR information associated with traffic being sent to and/or received from each of user devices 110.

For example, AR server 124 may, based on the monitoring, obtain information associated with user habits of each of user devices 110. AR server 124 may, for example, obtain information associated with a time (e.g., total time, peak time, average time, etc. per second, day, week, etc.) and/or at what cost (e.g., based on minutes used and/or rate per minute, etc.) that a particular user device 110 communicates with web server 140 and/or one or more other web servers (herein, collectively referred to as the one or more web servers). AR server 124 may obtain information associated with a quantity of content that is downloaded (e.g., total quantity of bytes per second, week, month, etc.), a quantity of bandwidth used (e.g., total, peak, average, etc. per second, week, month, etc.), and/or a quantity of purchases made (e.g., total, average, etc. per day, week, month, etc.) as a result of communications with the one or more web servers.

AR server 124 may obtain information associated with content that is accessed and/or downloaded from the one or more web servers, which may include a method of download (e.g., via streaming media, progressive download, etc.), a type of content (e.g., movies, video, music, audio, games, documents, images, etc.), a genre associated with the content (e.g., sports, science fiction, news, etc.), etc. Based on the information associated with the content, AR server 124 may generate a report that identifies a preferred content provider (e.g., top one, top five, top 10, etc.), a preferred type of content, a preferred genre of content, etc. for user device 110. Additionally, or alternatively, AR server 124 may generate another report that identifies a quantity of content that user device 110 is likely to download, a type of product that user device 110 is likely to purchase, a likelihood that user device 110 may purchase the type of product, etc. AR server 124 generate reports for other user devices 110 and/or may generate an aggregate report for service provider network 160 based on the reports for user device 110 and/or the other user devices 110.

AR server 124 may monitor flows (e.g., traffic) associated with user devices 110 that are transported via network 150 and may store information, associated with the flows, in a flow data record (FDR). The information, associated with the flows, may include information associated with a quantity of concurrent flows (e.g., total, average, peak, etc.), types and/or quantities of IP addresses (e.g., IP version four (IPv4) addresses, IP version six (IPv6) addresses, etc.), a time associated with peak flows, a time associated with peak quantities of each type of IP addresses, a quantity of DNS queries (e.g., from user device 110 to DNS cache 210), information associated with a duration of sessions (e.g., peak, average, minimum, etc.), etc. Additionally, or alternatively, the information associated with the flows may include information associated with data transfer rates (e.g., peak, average, minimum), trends associated with data transfer rates (e.g., increasing, decreasing, etc.), and/or upload to download ratios (e.g., based on a type of user device 110, location, etc.). AR server 124 may generate a report that includes information associated with the flows that originate from user device 110.

AR server 124 may collect information associated with network performance based on traffic flowing between user devices 110 and web server 140 and/or one or more other web servers. The information associated with the network performance may include information associated with a download time (e.g., peak, average, etc.), a quantity of latency and/or jitter per flow (e.g., peak, average, etc.), a quantity of lost and/or delayed packets (e.g., total, average, peak, etc.), etc.

Additionally, or alternatively, AR server 124 may, for example, correlate user habits, preferred content, preferred web server 140, etc., associated with user device 110, with user habits, preferred content, preferred web servers, etc. associated with other user devices that user device 110 communicates with.

AR server 124 may send all or a portion of the information, associated with user device 110, to toolbar server 130 (e.g., via CO server 126) that permits toolbar server to provide a toolbar, to user device 110, in a manner that is tailored and/or customized to the user habits associated with a subscriber of user device 110.

CO server 126 may include one or more server devices, or other types of computation or communication devices, that gather, process, search, store, and/or provide information in a manner similar to that described herein. In one example implementation, CO server 126 may perform content optimization operations on content being served to user device 110. For example, CO server 126 may process content, destined for user device 110, to maximize throughput and/or avoid congestion while being transported over network 150. CO server 126 may, in another example, convert the content to a format, based on a type of user device 110, that enables the content to be received, processed, and/or rendered on user device 110 within a period of time that is less than a threshold.

CO server 126 may perform network access translation (NAT) operations on traffic being sent to and/or received from user device 110. For example, CO server 126 may translate an internal Internet protocol (IP) address, obtained from traffic that is received from user device 110, to a corresponding public IP address that can be used by network web server 140 during a communication session with user device 110. In another example, CO server 126 may translate the public IP address, associated with traffic received from network 150 that is destined for user device 110, to a private IP address that can be used by EPC device 122 and/or network 150 to send the traffic to user device 110. CO server 126 may store, as information associated with NAT bindings, information associated with one or more private IP addresses that are associated with user device 110 in a manner that corresponds to one or more public IP addresses associated with user device 110.

CO server 126 may extract and/or remove information that permits the identity of user device 110 to be determined based on traffic and/or other information that is sent to web server 140. For example, CO optimization server may remove and/or extract information, associated with user device 110 (e.g., packets, data contained within packets and/or headers, etc.), included within the traffic being sent to web server 140. The information, associated with user device 110, may include an identifier associated with user device 110 (e.g., a mobile directory number (MDN), an electronic serial number (ESN), a subscriber identity module (SIM) universal resource identifier (URI), an international mobile subscriber identifier (IMSI), and/or other identifiers). In another example, CO server 126 may extract and/or remove information associated with a location of user device 110 (e.g., when a user, of user device 110, has not authorized dissemination of the location of user device 110).

CO server 126 may process the content in a number of ways. For example, CO server 126 may process the content, received from the CDN caching server and/or web server 140 by resizing packets, associated with the content. Resizing the packets may enable the content to be more efficiently served to user devices 110. For example, CO server 126 may process the packets in a manner that conforms to a maximum transmission unit (MTU) associated with network 150. Processing the packets in the manner that conforms to the MTU may permit the content to be served at a maximum data transfer rate (e.g., greater than a threshold) while avoiding congestion within network 150.

CO server 126 may process the packets by performing packet and/or header compression. The packets may be resized and/or compressed to achieve a maximum bandwidth and/or data transfer rate while avoiding congestion and serving the content to user device 110. CO server 126 may accelerate data delivery associated with the content by reducing the quantity of packets associated with transporting and/or serving content to user devices 110. For example, CO server 126 may perform acknowledgement packet thinning by delaying the transport of acknowledgment packets, which may reduce a quantity of redundant acknowledgement packets being transported between network 150 and CO server 126 while sending the content to user device 110.

In another example, CO server 126 may repackage one or more smaller packets into larger packets (e.g., up to the MTU) to increase a transfer data rate and/or bandwidth associated with the content. In yet another example, when lost packets are detected, CO server 126 may use selective acknowledgement packets, that identify packets that were received from content provider 150, which informs web server 140 to resend only those packets identified as missing.

CO server 126 may use one or more application programming interfaces (APIs) that permit CO server 126 to receive location-based services (LBS) from network 150. For example, CO server 126 may use an API, associated with the LBS (hereinafter referred to as an "LBS API"), to obtain, from network 150, information associated with a location of user device 110. The information associated with a location may include information associated with latitude and/or longitude information, a grid location, a geographic area, an address, etc., associated with each of user devices 110. CO server 126 may send the location information, associated with all or a portion of user devices 110, to toolbar server 130 and/or web server 140 if authorized by a subscriber associated with user devices 110. CO server 126 may not send the information, associated with the location, to toolbar server 130 and/or web server 140 if the subscriber has not authorized the dissemination of the location information.

CO server 126 may reduce processing time associated with user devices 110 for which content is being served. For example, CO server 126 may convert content, received from the CDN caching server and/or web server 140, into a format that can easily be received, processed, and/or rendered on user device 110. CO server 126 may, for example, use information associated with a type of user device 110 (e.g., a model identifier, information associated with an operating system being used by user device 110, etc.) to convert the received content into the format that causes a time, associated with mobile page rendering on user device 110, to be reduced (e.g., below a threshold). CO server 126 may identify user device 110 based on NAT bindings (e.g., described above with respect to EPC device 122) and may obtain information, associated with the type of user device 110, from information associated with a user profile for user device 110 (e.g., from a home subscriber server (HSS) associated with network 150).

Toolbar server 130 may represent a single server device or a collection of server devices and/or computer systems. Toolbar server 130 may store and/or have access to rules for selecting formats and components of toolbars based on subscriber data (e.g., a type of user agent, such as a browser, used by a user of user device 110) and/or information associated with web pages (e.g., addresses of the web pages). For example, one of the rules may specify that a particular format and particular components are to be selected for a toolbar when the toolbar is for a particular web page (e.g., corresponding to www.example.com) and user device 110 has a particular type of browser (e.g., a mobile device browser). A format of a toolbar may include one or more of a size, a layout of components, a color, a style (e.g., a font), an orientation (e.g., horizontal or vertical), and/or one or more other features associated with an appearance of the toolbar.

Alternatively, or additionally, toolbar server 130 may also store and/or have access to rules for identifying insertion points based on the subscriber data and/or the information associated with the web pages. For example, one of the rules may specify a particular insertion point in a HTML code of the particular web page when user device 110 has a particular type of browser.

Toolbar server 130 may receive a request for a toolbar from CDS 120. Toolbar server 130 may select components and/or a format for the toolbar, generate code for the toolbar, and/or identify an insertion point, of a web page, for the toolbar based on information provided by CDS 120 in the request for the toolbar. Toolbar server 130 may transmit the code for the toolbar and the insertion point to CDS 120.

CDS 120 and/or toolbar server 130 may transfer information between one another by using an Internet Protocol (IP), a Transmission Control Protocol (TCP), an IP Flow Information Export (IPFIX) protocol, a HTTP, a User Datagram Protocol (UDP), and/or any other method for transferring structured data from one device to another. Alternatively, or additionally, CDS 120 and toolbar server 130 may be combined into a single system.

In one example, toolbar server 130 may include an analytics engine (not shown in FIG. 1). The analytics engine may receive information from AR server 124 of CDS 120. The information may include, for example, browsing history of the user, which may be collected based on web page requests received from user device 110 of the user. The analytics engine may adjust rules and/or create new rules for selecting components of toolbars based on the collected information.

Web server 140 may represent a single server device or a collection of server devices and/or computer systems for hosting a website. Web server 140 may receive a request (e.g., an HTTP GET request) for a particular web page of the website. Web server 140 may retrieve code (e.g., Hypertext Markup Language (HTML) code) of the particular web page. Web server 140 may transmit the web page, in the form of the code, to user device 110 via CDS 120 and/or network 150.

Network 150 may include a single network, multiple networks of a same type, or multiple networks of different types. For example, network 150 may include one or more of a direct connection between devices, a local area network (LAN), a wide area network (WAN) (e.g., the Internet), a metropolitan area network (MAN), a wireless network (e.g., a general packet radio service (GPRS) network), a telephone network (e.g., a Public Switched Telephone Network (PSTN) or a cellular network), a subset of the Internet, an ad hoc network, a fiber optic network (e.g., a fiber optic service (FiOS) network), or any combination of the aforementioned networks.

Figure 2:
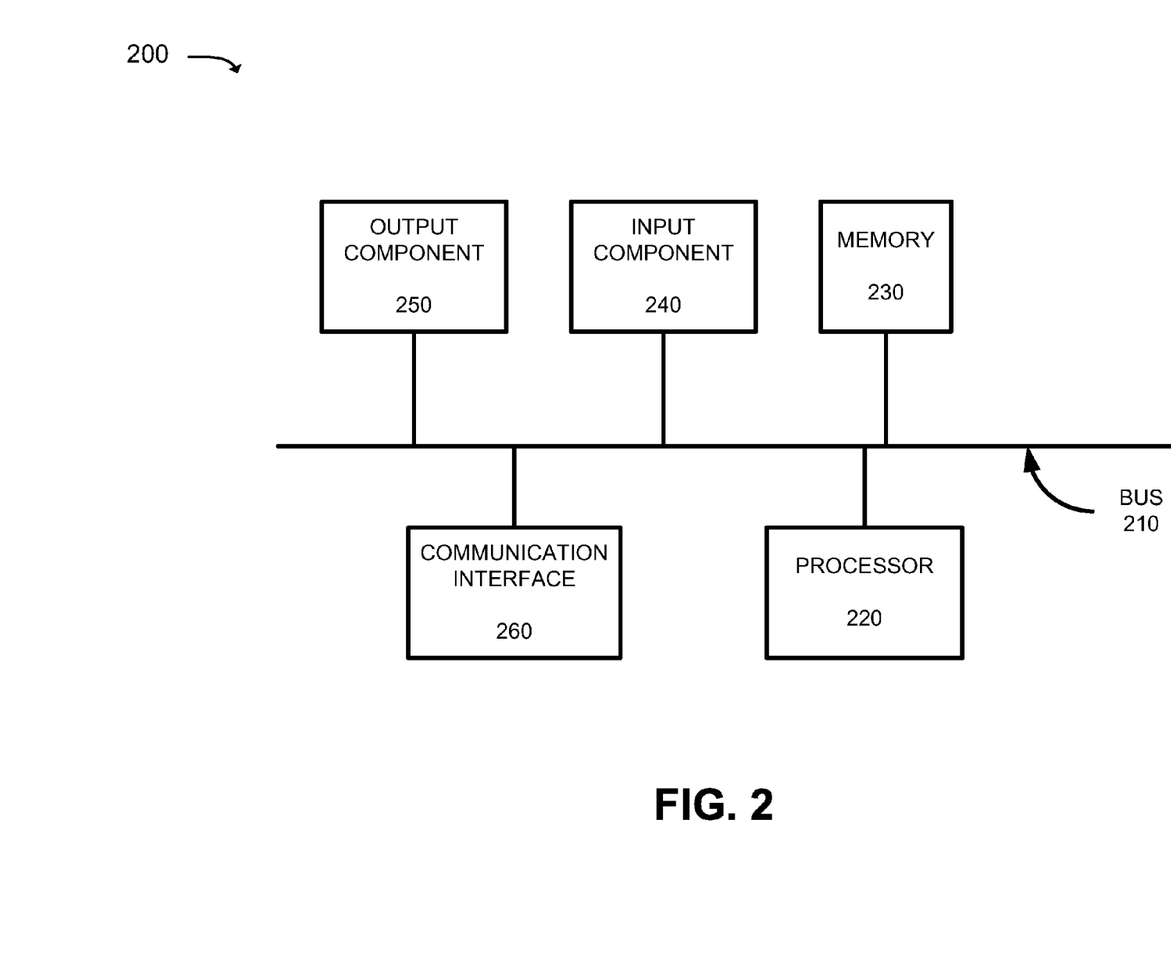
FIG. 2 is a diagram of example components of one or more of the devices of FIG. 1.

FIG. 2 is a diagram of example components of a device 200 that may be associated with user device 110, CDS 120, EPC device 122, AR server 124, CO server 126, toolbar server 130, and/or web server 140. Each one of user device 110, CDS 120, EPC device 122, AR server 124, CO server 126, toolbar server 130, and/or web server 140 may include one or more devices 200 and/or one or more of each one of the components of device 200.

As shown in FIG. 2, device 200 may include a bus 210, a processor 220, a memory 230, an input component 240, an output component 250, and a communication interface 260. In another implementation, device 200 may include additional components, fewer components, different components, and/or differently arranged components than are shown in FIG. 2. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions for execution by processor 220, and/or any type of non-volatile storage device that may store information for use by processor 220.

Input component 240 may include one or more input mechanisms that permit a user to input information to device 200. Output component 350 may include one or more output mechanisms that output information to the user. Examples of input and output mechanisms may include buttons; a touch screen interface to permit data and control commands to be input into device 200; a speaker to receive electrical signals and output audio signals; a microphone to receive audio signals and output electrical signals; a display to output visual information (e.g., web pages, product information, etc.); etc.

Communication interface 260 may include any transceiver-like mechanism that enables device 200 to communicate with other devices and/or systems. For example, communication interface 260 may include an Ethernet interface, an optical interface, a coaxial interface, a wireless interface, or the like.

Device 200 may perform certain operations described herein. Device 200 may perform these operations in response to processor 220 executing software instructions (e.g., computer program(s)) contained in a computer-readable medium, such as memory 230, a secondary storage device (e.g., a hard disk, etc.), or other forms of random access memory (RAM) or read only memory (ROM). A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
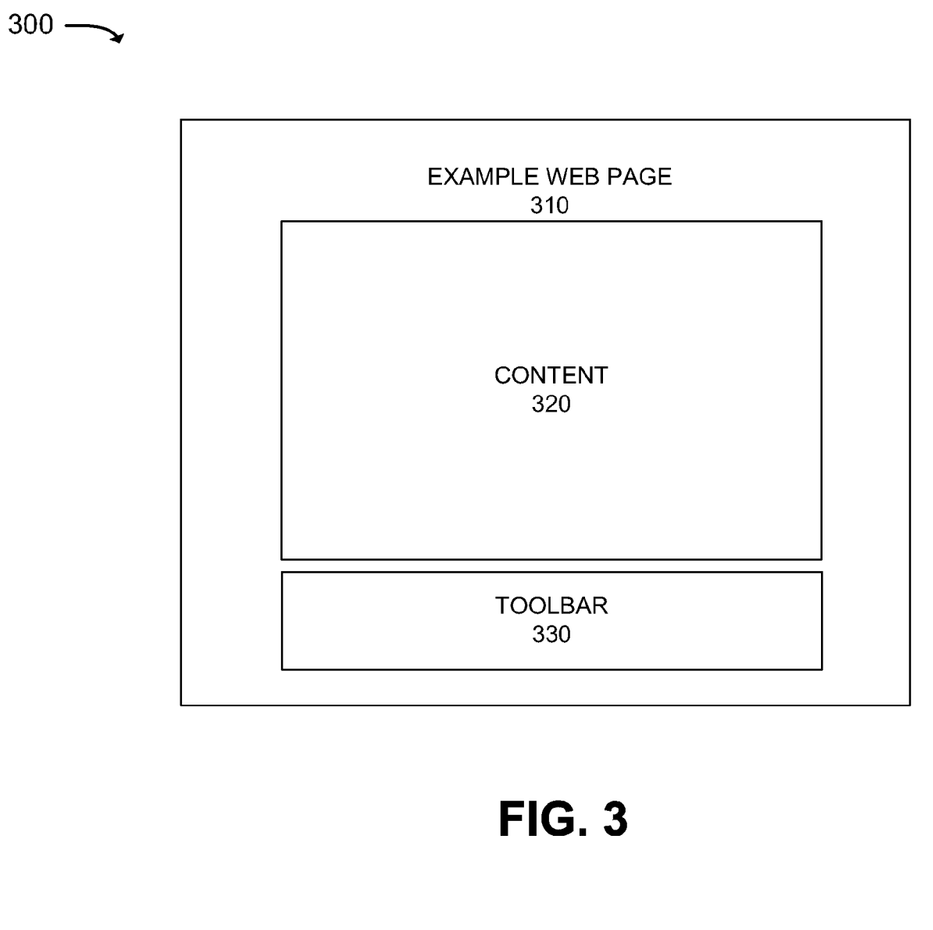
FIG. 3 illustrates an example user interface of a web page with a toolbar.

FIG. 3 illustrates an example user interface 300 for displaying a web page with a toolbar. As shown in FIG. 3, user interface 300 may include a web page 310 that includes content 320 and a toolbar 330. In other implementations, user interface 300 may include additional components, fewer components, different components, or differently arranged components than are shown in FIG. 3.

In one example, as discussed further below, user device 110 may transmit a request for web page 310 of a website. The request may include a URL (e.g., www.example.com) that identifies web page 310. Management server 130 may retrieve content 320 of web page 310 from web server 140. Content 320 may include HTML code for web page 310. Management server 130 may retrieve toolbar 330 from toolbar server 130. Toolbar 330 may include HTML code for toolbar 330. Management server 130 may insert toolbar 330 into web page 310 to form user interface 300. Management server 130 may transmit web page 310, with inserted toolbar 330, to user device 110. User device 110 may display web page 310 with content 320 and toolbar 330.

Figure 4:
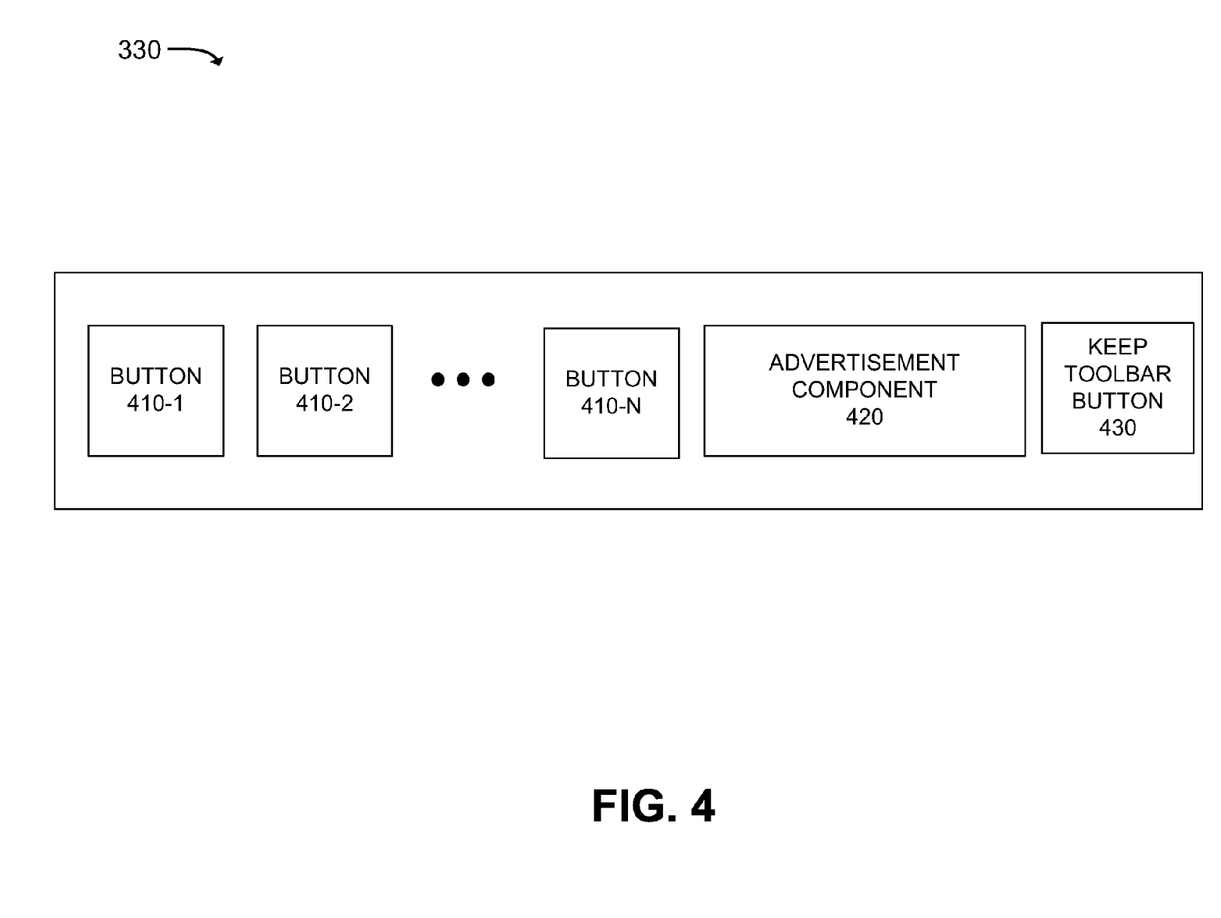
FIG. 4 illustrates example components of the toolbar of FIG. 3.

FIG. 4 illustrates example components of toolbar 330. As shown in FIG. 4, toolbar 330 may include one or more of: buttons 410-1, 410-2, . . . , 410-N (collectively referred to as "buttons 410" and individually as "button 410"); an advertisement component 420; and a keep toolbar button 430. In other implementations, toolbar 330 may include additional components, fewer components, different components, or differently arranged components than are shown in FIG. 4.

Button 410 may include a mechanism that executes a script when selected. Herein, a button may refer to a drop down menu, an icon, a link, and/or any other type of user interface element. The script may cause user device 110 to retrieve information associated with web page 310, content 320, user device 110, and/or a user of user device 110. The script may cause user device 110 to transmit the retrieved information to another website. Each one of buttons 410 may correspond to a different web service. In one example, button 410-1 may correspond to a social networking service. When a user of user device 110 selects button 410-1, information associated with web page 310 may be posted on a profile of the social network of the user. Alternatively, or additionally, button 410-2 may correspond to an email service. When the user of user device 110 selects button 410-2, the user may use their email account, provided by the email service, to retrieve email information associated with web page 310.

Advertisement component 420 may include one or more advertisements. Each one of the advertisements may include a banner and a hyperlink (e.g., a URL) to a website associated with an advertiser. Toolbar server 130 may select one or more of the advertisements based on demographic information, purchasing history, and/or browsing history of the user (e.g., when the user opts-in for targeted advertising) and information associated with example web page 310. The demographic information, the purchasing history, and/or the browsing history may be collected and used by a communication service provider (e.g., the ISP that operates CDS 120) with the user's permission.

Keep toolbar button 430 may include a mechanism to allow a user of user device 110 to keep toolbar 430. In response to the selection of keep toolbar button 430, user device 110 may transmit a request, for user device 110 to keep toolbar 330, to CDS 120.

Figure 5:
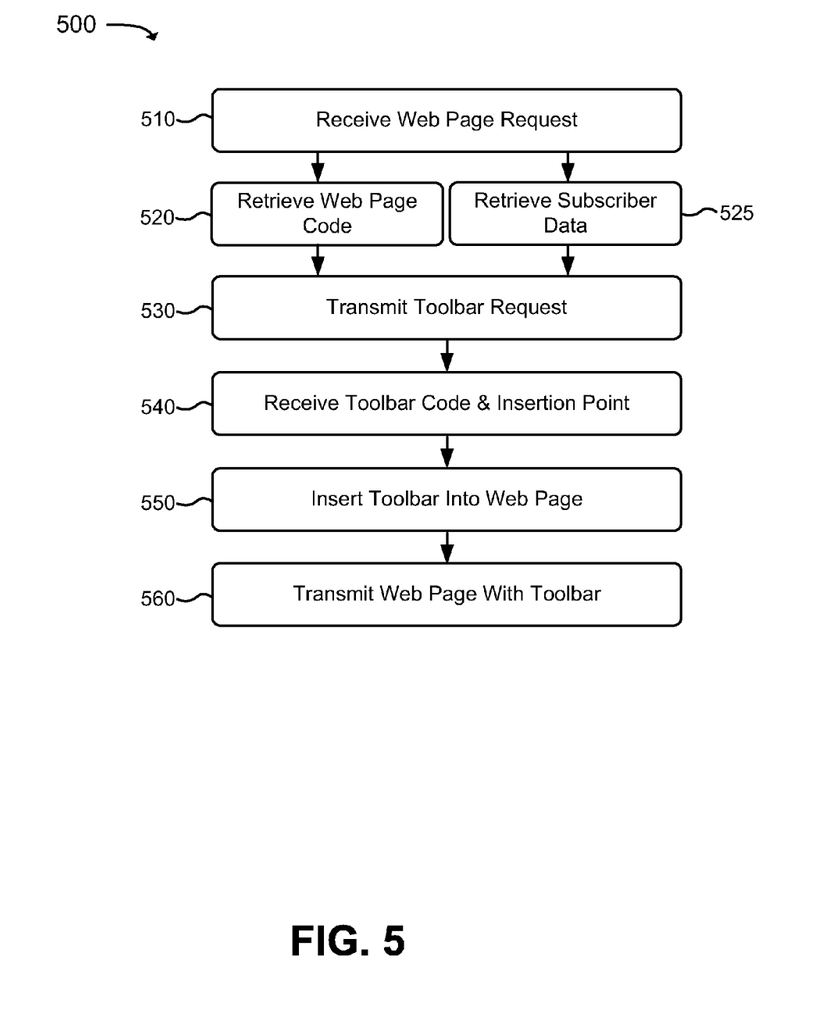
FIG. 5 is a flow chart of an example process for providing a web page with a toolbar.

FIG. 5 is a flow chart of an example process 500 for providing a web page with a toolbar. In one implementation, CDS 120 may perform process 500. Alternatively, or additionally, a device or collection of devices separate from, or in combination with, CDS 120 may perform some or all of process 500.

As show in FIG. 5, process 500 may include receiving a web page request (block 510). For example, a user may use user device 110 to open an Internet browser. In one implementation, the user may enter a URL of a web page, of a website, into an address bar of the Internet browser. Alternatively, or additionally, the user may select a hyperlink to the web page. Thereafter, user device 110 may transmit a web page request, to request the web page, to web server 140, which hosts the website that includes the web page. The web page request may include the URL of the web page and one or more identifiers (e.g., an IP address and a port) associated with user device 110. CDS 120 may receive the web page by intercepting the web page request while the web page request is being transmitted via network 150 from user device 110 to web server 140.

Process 500 may further include retrieving web page code (block 520). For example, after receiving/intercepting the web page request, CDS 120 may forward the web page request, or an HTTP GET request of the web page request, to web server 140. In one implementation, CDS 120 may identify a location of the web page (e.g., stored in web server 140) by using a reverse IP look-up. Alternatively, or additionally, CDS 120 may identify the location of the web page by using a DNS query evaluation. Web server 140 may receive the web page request, retrieve web page code (e.g., HTML code) of the web page, and transmit the web page code to user device 110 via network 150. CDS 120 may receive/intercept the web page code.

Process 500 may also include retrieving subscriber data (block 525). For example, while retrieving the web page, CDS 120 may simultaneously retrieve subscriber data associated with user device 110 and/or the user of user device 110. In one implementation, CDS 120 may determine a telephone number (e.g., a mobile device number (MDN)) of user device 110 based on the identifiers included in the web page request. Alternatively, or additionally, CDS 120 may determine an International Mobile Equipment Identifier (IMEI) of user device 110 based on the identifiers included in the web page request. In one example, CDS 120 may retrieve the subscriber data from one or more databases based on the telephone number and/or the IMEI.

In another example, a storage device of CDS 120 may store an analytics and reporting data structure (hereinafter referred to as "AR data structure"), associated with user device 110, that includes a portion of the subscriber data. The AR data structure may include, for example, one or more of demographics information, toolbar preferences, content, usage patterns, network performance and/or other information associated with user device 110, as described further below with reference to FIG. 7. The toolbar preferences may include a format and/or one or more types of components, for toolbars, requested by the user from a service provider associated with (e.g., that operates) CDS 120.

In yet another example, CDS 120 may retrieve another portion of the subscriber data from an HSS associated with network 150. The other portion of the subscriber data may include, for example, a type of user device 110 (e.g., a generation of technology used by user device 110 (e.g., a third-generation (3G) wireless telephone technology device), information associated with an operating system being used by user device 110, etc.), user agent capabilities associated with user device 110 and/or the Internet browser of user device 110, etc.).

Process 500 may also include transmitting a toolbar request (block 530) and receiving toolbar code and an insertion point (block 540). For example, after receiving the web page code and the subscriber data, CDS 120 may transmit a toolbar request to toolbar server 130. The toolbar request may include information associated with the web page (e.g., the URL of the web page) and the subscriber data. Toolbar server 130 may select a format and components for a toolbar based on the subscriber data (e.g., content, usage patterns, and/or network performance associated with user device 110) and/or the information associated with the web page. The components may include for example, one or more buttons 410, advertisement component 420, and/or keep toolbar button 430 (FIG. 4).

Toolbar server 130 may generate toolbar code (e.g., executable code) for the toolbar based on the selected format and the selected contents. Toolbar server 130 may further select an insertion point based on the user agent capabilities, included in the subscriber data, and/or the information associated with the web page. The insertion point may specify a location of the web page code (e.g., a line in the HTML code of the web page) in which to insert the toolbar. Toolbar server 130 may transmit the toolbar code and the insertion point to CDS 120. CDS 120 may receive the toolbar code and the insertion point.

Process 500 may also include inserting the toolbar into the web page (block 550) and transmitting the web page with the toolbar (block 560). For example, CDS 120 may insert the toolbar into the web page by inserting the toolbar code at the insertion point of the web page code. Thereafter, CDS 120 may transmit the web page with the toolbar, in the form of the web page code that includes the toolbar code, to user device 110. User device 110 may display the web page with the toolbar, in the Internet browser, based on the web page code. The user may use user device 110 to select one or more components of the toolbar.

Alternatively, or additionally, CDS 120 may store and/or have access to a list of subscribers that requested to not include toolbars in web pages. Before transmitting the toolbar request (block 530), CDS 120 may determine whether the user, of user device 110, is included in the list based on the telephone number and/or the IMEI of user device 110. If CDS 120 determines that the user is included in the list, CDS 120 may transmit the web page code, without the toolbar code, to user device 110. User device 110 may display the web page without any toolbar. If CDS 120 determines that the user is not included in the list, CDS 120 may transmit the toolbar request (block 530).

Figure 6:
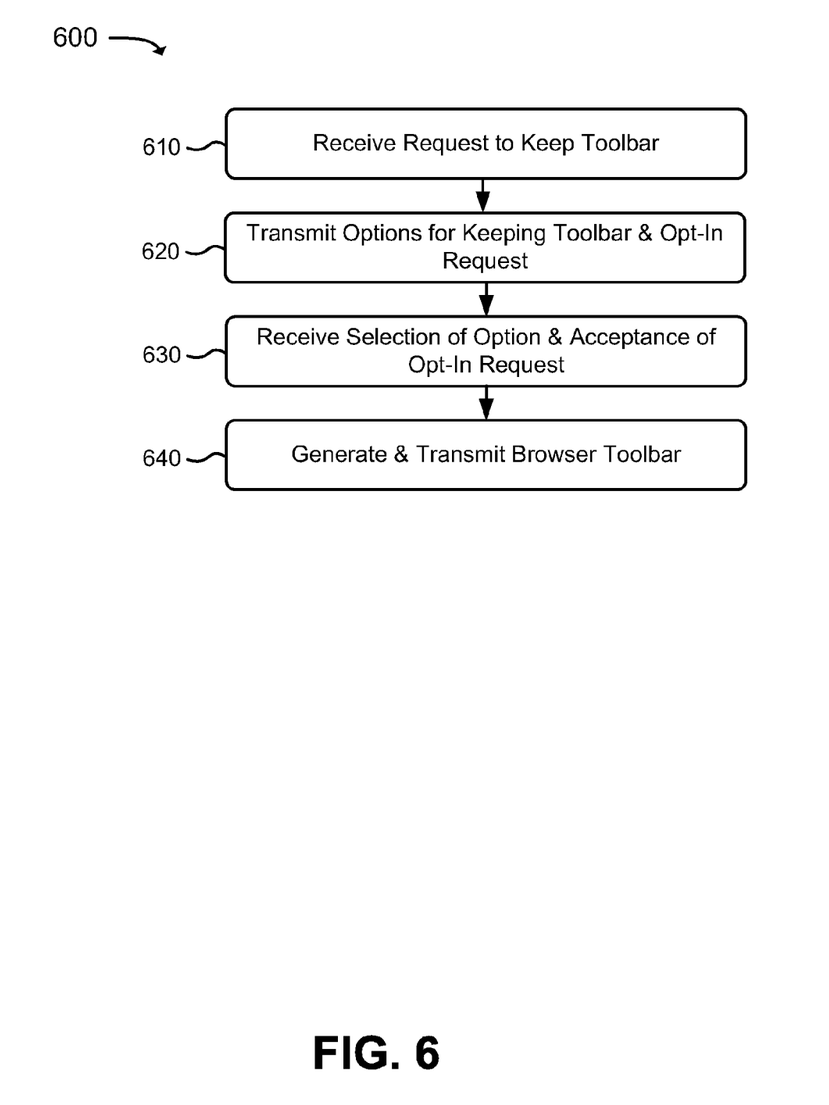
FIG. 6 is a flow chart of an example process for providing a browser toolbar.

FIG. 6 is a flow chart of an example process 600 for providing a browser toolbar. In one implementation, CDS 120 may perform process 600. Alternatively, or additionally, a device or collection of devices separate from, or in combination with, CDS 120 may perform some or all of process 600. Process 600 is described below with reference to toolbar 330 of FIG. 4.

Process 600 may include receiving a request to keep a toolbar (block 610). For example, process 600 may occur after a web page with a toolbar is received by user device 110 from CDS 120. The toolbar may include keep toolbar button 430 (FIG. 4). Assume that a user of user device 110 decides to keep the toolbar while browsing other web pages in the future. The user may use user device 110 to select keep toolbar button 430. In response, user device 100 may transmit a request to keep the toolbar to CDS 120. CDS 120 may receive the request to keep the toolbar.

Process 600 may further include transmitting options for keeping the toolbar and an opt-in request (block 620) and receiving a selection of an option and an acceptance of the opt-in request (block 630). For example, after receiving the request to keep toolbar 330, management server 130 transmit options for keeping toolbar 330 and an opt-in request to user device 110. The options for keeping toolbar 330 may include options to keep toolbar 330 for limited periods of time (e.g., one day, a few days, etc.) or permanently. The opt-in request may include a request to track browsing history and/or purchasing history of the user to provide targeted advertising to the user via toolbar 330. The user may use user device 110 to select one option of the options and to accept the opt-in request. CDS 120 may receive the selection of one of the options and the acceptance of the opt-in request.

Process 600 may also include generating and transmitting a browser toolbar (block 640). For example, after receiving the selection of the option, CDS 120 may generate a browser toolbar that includes the format and/or the components of toolbar 330 included in web page 310. CDS 120 may transmit the browser toolbar to user device 110. User device 110 may include the browser toolbar in the Internet browser of user device 110 for a particular period of time (e.g., permanently, one day, etc.) specified by the selected option. The user may browse to other web pages via the Internet browser. The user may select one or more components of the browser toolbar while viewing the other web pages.

While the user is browsing to and/or viewing the other web pages, CDS 120 may select targeted advertising for the user based on information collected about the user (e.g., the browsing history and/or the purchasing history). CDS 120 may transmit the selected targeted advertising to user device 110. User device 110 may display the targeted advertising in advertisement component 420 (FIG. 4) of the browser toolbar. The user may select one or more hyperlinks associated with the targeted advertising.

Figure 7:
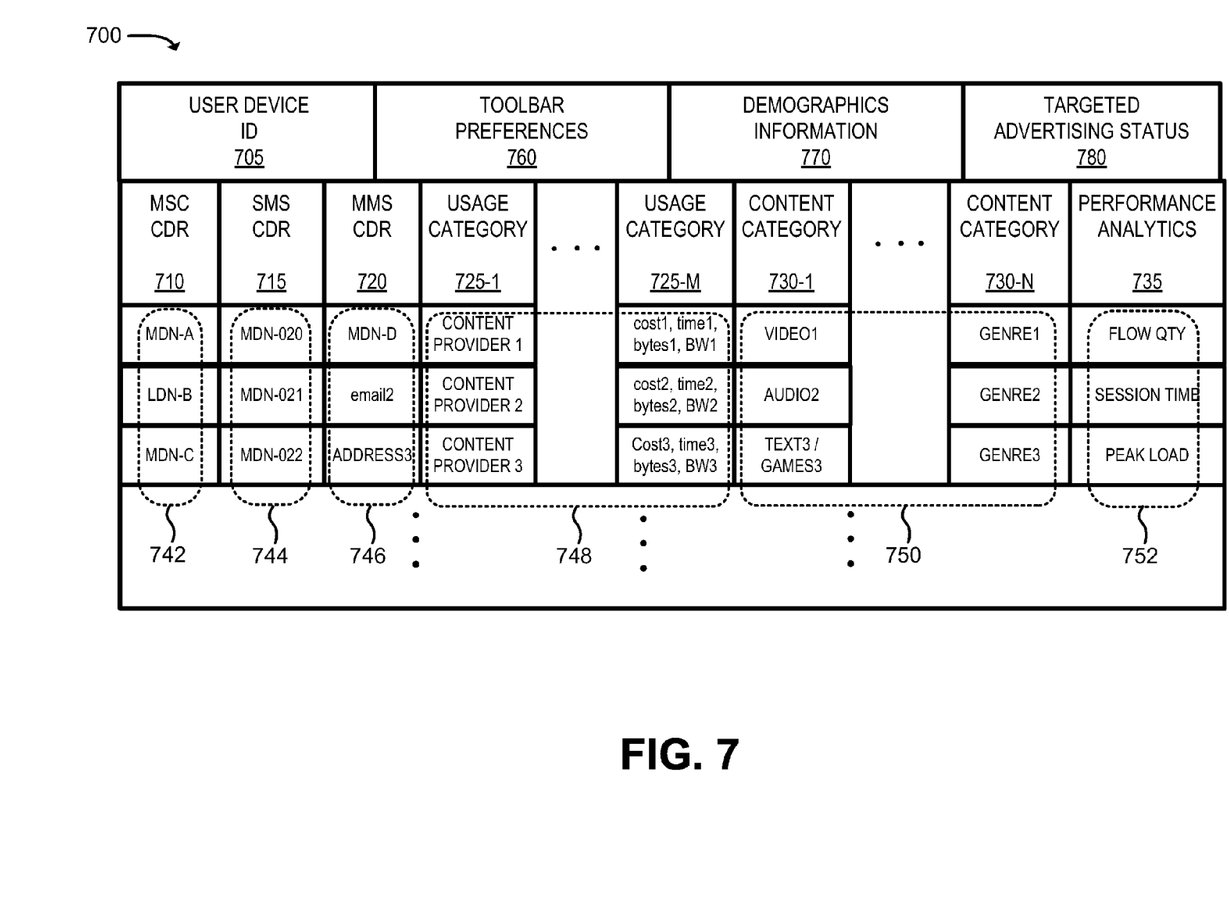
FIG. 7 is a diagram of an example data structure that stores information associated with a user device of FIG. 1.

FIG. 7 is a diagram of an example data structure 700 (hereinafter referred to as "AR data structure 700") that stores subscriber data associated with user device 110. As shown in FIG. 7, AR data structure 700 may include a collection of fields, such as a user device identifier (ID) field 705, a mobile switching center (MSC) call data record (CDR) field 710, a short message service (SMS) call data record (CDR) field 715, a multi-media service (MMS) call data record (CDR) field 720, a group of usage category fields 725-1, . . . , 725-M (where M≥1), a group of content category fields 730-1, . . . , 730-N (where N≥1), a performance analytics field 735, a toolbar preferences field 760, a demographics information field 770, and a targeted advertising status field 780. AR data structure 700 includes these fields for explanatory purposes. In practice, AR data structure 700 may include additional fields, fewer fields, different fields, and/or differently arranged fields than are described with respect to AR data structure 700.

User device ID field 705 may store information associated with a particular user device 110. The information, associated with the particular user device 110, may include an identifier (e.g., a MDN, an IMSI, a SIM URI, etc.). MSC CDR field 710 may store information associated with calls to and/or from the particular user device 110. For example, information, associated with a call may include information associated with other user devices 110 (e.g., MDN-A, LDN-B, MDN-C, etc, as shown by ellipse 742 of FIG. 7) with which the particular user device 110 is communicating, information associated with a manner in which the call was routed, a time associated with the call, a duration associated with the call, etc. SMS CDR field 715 may store information associated with messages (e.g., SMS messages) sent to or from the particular user device 110. For example, the information, associated with a message may include information associated with other user devices (e.g., MDN-020, MDN-021, MDN-022, etc., as shown by ellipse 744) with which the particular user device 110 was communicating, information associated with a manner in which the message was routed, a time associated with the message, a quantity of bytes associated with the message, etc. MMS CDR field 720 may store information associated with multi-media messages (e.g., MMS messages) sent to and/or from the particular user device 110. For example, information, associated with a multi-media message may include information associated with other user devices (e.g., MDN-D, email2, IP address3, etc., as shown by ellipse 746 of FIG. 7) with which the particular user device 110 was communicating, information associated with a manner in which the multi-media message was routed, a time associated with the multi-media message, a quantity of bytes associated with the multi-media message, etc.

Usage category field 725 may store AR information associated with user habits that correspond to the particular user device 110. For example, CDS 120 may store, in usage category field 725, information associated with a cumulative time (e.g., total time, peak time, average time, etc. per second, day, week, etc.) and/or a cost (e.g., based on minutes used and/or rate per minute, etc.) that a particular user device 110 communicates with web server 140 and/or one or more other web servers 140. CDS 120 may store information associated with a quantity of content that is downloaded (e.g., bytes per second, week, month, etc.), a quantity of bandwidth and/or a data transfer rate used to download the content (e.g., total, peak, average, etc. per second, week, month, etc.), times of day when user device 110 is receiving content, etc. as a result of communications with each of the web servers. For example, as shown in ellipse 748 of FIG. 7, usage category fields 725 may include information associated with web server 140 and/or one/or one or more other web servers (e.g., content provider 1, content provider 2, content provider 3, etc.); corresponding costs (e.g., cost1, cost 2, cost3, etc.); corresponding times (e.g., time1, time2, time3, etc.); corresponding quantities of content that is downloaded (e.g., byte1, byte2, byte3, etc.); and corresponding data transfer rate used to download the content (e.g., BW1, BW2, BW3, etc.).

Content category field 730 may store AR information associated with content that has been served to the particular user device 110. For example, CDS 120 may store, in content category field 730, information associated with a type of content (e.g., movies, video, music, audio, games, documents, images, etc.), a genre associated with the content (e.g., sports, science fiction, news, etc.), and/or purchases of goods and/or services (e.g., total, average, etc. per day, week, month, etc.) obtained via interactions with web server 140 and/or one or more other web servers 140. In another example, CDS 120 may sort the information associated with the content based on a quantity of times that the particular user device 110 accesses, downloads, and/or purchases content associated with each genre, each type of content, and/or one or more types of goods and/or services from web server 140 and/or one or more other web servers 140. Based on the sorting of the information, CDS 120 may identify one or more preferred web servers (e.g., top one, time five, top 10, etc.), one or more preferred types of content (e.g., top one, time five, top 10, etc.), and/or one or more preferred content genres (e.g., top one, time five, top 10, etc.) associated with the particular user device 110. For example, as shown in ellipse 750, content category fields 730 may include information associated with a type of content (e.g., video1, audio2, text3/games3, etc.) and/or a genre associated with the content (e.g., genre1, genre2, genre3, etc.).

Performance analytics field 735 may store AR information corresponding to performance of network 150 when serving content to the particular user device 110. For example, CDS 120 may store, in performance analytics field 735, information associated with a quantity of flows (e.g., total, average, peak, etc. per day, week, month, etc.) associated with the particular user device 110, types and/or quantities of IP addresses used during communications (e.g., IPv4 addresses, IPv6 addresses, etc.) associated with the particular user device 110, a quantity of DNS queries (e.g., from user device 110 to DNS cache 210), and/or information associated with a duration of communications (e.g., peak, average, minimum, etc.) in connection with the particular user device 110.

CDS 120 may store, in performance analytics field 735, information associated with data transfer rates (e.g., peak, average, minimum), trends associated with data transfer rates (e.g., increasing, decreasing, etc.), and/or upload to download ratios (e.g., based on a type of the particular user device 110, location, etc.). Additionally, or alternatively, CDS 120 may store, in performance analytics field 735, information associated with a quantity of latency and/or jitter per flow (e.g., peak, average, etc.), a quantity of lost and/or delayed packets (e.g., total, average, peak, etc.) etc. in connection with the particular user device 110 when communicating to web server 140. For example, as shown in ellipse 752, performance analytics fields 730 may include a flow quantity, a session time, and/or a peak load.

Toolbar preferences field 760 may store information about toolbars used by toolbar server 130 to generate a toolbar provided to user device 110. Toolbar preferences field 760 may include, for example, a format and/or one or more types of components, for toolbars, requested by the user from a service provider associated with (e.g., that operates) CDS 120. In another implementation, CDS 120 may update toolbar preferences field 760 based on information collected about use of toolbars by a user of user device 110.

Demographics information field 770 may include information about a user (e.g., a subscriber) associated with user device 110. Demographics information field 770 may include, for example, an age of the user, a gender of the user, an income of the user, an occupation of the user, family information associated with the user, etc. In some implementations, CDS 120 may only store information in demographics information field 770 after receiving authorization from the user to retrieve, collect, and store demographics information of the user. Targeted advertising status field 780 may store information that indicates whether the user opted-in for targeted advertising, as described above.

The foregoing description provides illustration and description, but is not intended to be exhaustive or to limit the embodiments to the precise form disclosed. Modifications and variations are possible in light of the above teachings or may be acquired from practice of the embodiments.

While series of blocks have been described with regard to FIGS. 5 and 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a server device and from a user device, a request for a document associated with a website;
    retrieving, by the server device, the document from a server that hosts the website;
    retrieving, by the server device, information associated with the user device, where the information comprises at least one of information related to content served to the user device from a content distribution system, usage patterns information, or network performance information associated with the user device, and wherein the network performance information includes information associated with at least one of a download time, latency per flow, jitter per flow, lost packets, or delayed packets;
    determining, by the server device, a toolbar for the document based on the information associated with the user device and information associated with the document, wherein the toolbar comprises a keep toolbar button;
    inserting, by the server device, the toolbar into the document;
    transmitting, by the server device, the document, with the toolbar, to the user device; and
    in response to selection of the keep toolbar button, receiving, by the server device and from the user device, a request to keep the toolbar permanently or for a period of time when the user device displays other documents.

2. The method of claim 1, where the request comprises a uniform resource locator (URL) of the document and an identifier associated with the user device.

3. The method of claim 1, where retrieving information associated with the user device comprises:
    determining a phone number or an International Mobile Equipment Identifier (IMEI) of the user device based on information included in the request, and
    retrieving the information associated with the user device based on the phone number or the IMEI.

4. The method of claim 1, where the information associated with the user device further comprises one or more of:
    demographics information associated with a user of the user device, or
    toolbar preferences associated with the user.

5. The method of claim 1, where the information associated with the user device further comprises:
    a format requested by a user, of the user device, for the toolbar, and
    one or more components requested by the user for the toolbar.

6. The method of claim 1, further comprising:
    determining an insertion point for the toolbar based on the information associated with the user device and the information associated with the document, where the information associated with the user device comprise at least one of capabilities of a browser of the user device or a type associated with the user device.

7. The method of claim 6,
    where inserting the toolbar into the document comprises:
        inserting hypertext markup language (HTML) code of the toolbar at a line in HTML code of the document specified by the insertion point, and
    where transmitting the document with the toolbar comprises:
        transmitting the HTML code of the document with the HTML code of the toolbar.

8. The method of claim 1, further comprising:
    receiving, from the user device, a request to keep the toolbar transmitted with the document;
    transmitting, to the user device, an opt-in request for a user of the user device to opt-in for targeted advertising;
    receiving, from the user device, an acceptance of the opt-in request; and
    transmitting, to the user device, a new toolbar for a browser of the user device, where the new toolbar comprises one or more components of the toolbar inserted into the document.

9. The method of claim 8, further comprising:
    collecting browsing history of the user;
    selecting targeted advertising for the user device based on the browsing history; and
    transmitting, to the user device, the selected targeted advertising.

10. A device comprising:
    a memory to store data associated with a user device; and
    a processor to:
        intercept a web page request, for a web page of a website, transmitted from the user device,
        determine an identifier associated with the user device based on the web page request,
        retrieve the data based on the identifier, where the data comprises information associated with at least one of content served to the user device from a content distribution system, usage patterns, or network performance associated with the user device, and wherein the network performance information includes information associated with at least one of a download time, latency per flow, jitter per flow, lost packets, or delayed packets,
        retrieve the web page from a web server associated with the website,
        determine a toolbar for the web page based on the data and information associated with the web page wherein the toolbar comprises a keep toolbar button,
        transmit the web page with the toolbar to the user device; and
        in response to selection of the keep toolbar button, receive, from the user device, a request to keep the toolbar permanently or for a period of time when the user device displays other documents.

11. The device of claim 10,
where, when determining the toolbar for the web page, the processor is further to:
transmit a toolbar request to a toolbar server, and
receive, from the toolbar server, toolbar code for the toolbar and an insertion point,
where the toolbar request comprises the data and the information associated with the web page, and
where the insertion point specifies a location of the web page at which to insert the toolbar.

12. The device of claim 11, where, when transmitting the web page with the toolbar, the processor is further to:
insert toolbar code at the insertion point of web page code of the web page, and
transmit the web page code to the user device.

13. The device of claim 10, where the data further comprises one or more of:
a type associated with the user device,
capabilities of a browser of the user device,
a format requested by a user, of the user device, for the toolbar, or
one or more types of components requested by the user for the toolbar.

14. The device of claim 10, where the information associated with the web page comprises a uniform resource locator (URL) of the web page.

15. One or more non-transitory computer-readable media storing instructions executable by one or more processors of a device to perform a method, the media comprising:
one or more instructions to transmit a toolbar request to a server,
where the toolbar request comprises first information associated with a web page and second information associated with a mobile device, and
where the second information comprises at least one of information related to content served to the mobile device from a content distribution system, usage patterns information, or network performance information collected about the mobile device, and wherein the network performance information includes information associated with at least one of a download time, latency per flow, jitter per flow, lost packets, or delayed packets;
one or more instructions to receive, from the server, toolbar code for a toolbar and an insertion point, wherein the toolbar comprises a component to transmit, in response to selection of the component, a request to keep the toolbar permanently or for a period of time when the mobile device displays other documents;
one or more instructions to send, to the server, in response to selection of the component, the request to keep the toolbar permanently or for a period of time when the mobile device displays other documents;
one or more instructions to insert the toolbar code into web page code, of the web page, at the insertion point of the web page code; and
one or more instructions to transmit the web page code to the mobile device.

16. The media of claim 15,
where the toolbar comprises one or more buttons associated with one or more web services; and
where the second information comprises a selection of the one or more buttons by a subscriber associated with the mobile device.

17. The media of claim 15, where the media further comprises:
one or more instructions to receive, from the mobile device, a web page request for the web page; and
one or more instructions to retrieve, from a web server associated with the web page, the web page code based on the web page request, and
where the first information comprises a uniform resource locator (URL) of the web page.

18. The media of claim 17,
where the media further comprises:
one or more instructions to determine an identifier of a subscriber associated with the mobile device based on the web page request; and
one or more instructions to retrieve the second information based on the identifier, and
where the second information comprises at least one or more of:
a format requested by the subscriber for the toolbar, or
one or more components requested by the subscriber for the toolbar.

19. The media of claim 16,
where the media further comprises:
one or more instructions to receive, from the mobile device, an acceptance to opt-in for targeted advertising;
one or more instructions to collect new information associated with the subscriber;
one or more instructions to select targeted advertising for the mobile device based on the new information; and
one or more instructions to transmit, to the mobile device, the selected targeted advertising.

20. A method comprising:
receiving, by a server device and from a user device, a request for a web page associated with a website;
retrieving, by the server device, the web page from a server that hosts the website;
retrieving, by the server device, information associated with the user device, where the information comprises at least one of information related to content served to the user device from a content distribution system, usage patterns information, or network performance information associated with the user device;
determining, by the server device, a toolbar for the web page based on the information associated with the user device and information associated with the web page, wherein the toolbar includes a keep toolbar button;
inserting, by the server device, the toolbar into the web page; and
transmitting, by the server device, the web page, with the toolbar, to the user device,
wherein in response to selection of the keep toolbar button, the server device receives a request of keeping the toolbar permanently or for a period of time when the user device displays one or more web pages which are different from the web page.

21. The method of claim 20, wherein the network performance information includes information associated with at least one of a download time, latency per flow, jitter per flow, lost packets, or delayed packets.

* * * * *